United States Patent [19]

Shurman

[11] Patent Number: 4,740,145
[45] Date of Patent: Apr. 26, 1988

[54] FLASH-FREE VENTED TIRE MOLD

[75] Inventor: Louis W. Shurman, Canton, Ohio

[73] Assignee: The Firestone Tire & Rubber Company, Akron, Ohio

[21] Appl. No.: 73,611

[22] Filed: Jul. 15, 1987

[51] Int. Cl.[4] ..................... B29C 33/10; B29C 35/02
[52] U.S. Cl. ................................ 425/28.1; 249/141; 425/812
[58] Field of Search .............. 425/28 R, 34, 812, 388; 249/141

[56] References Cited

U.S. PATENT DOCUMENTS

| | | | |
|---|---|---|---|
| 3,266,099 | 8/1966 | Bucy | 425/812 |
| 3,377,662 | 4/1968 | Fukushima | 425/28 R |
| 3,804,566 | 4/1974 | Kimura et al. | 425/28 |
| 3,822,857 | 7/1974 | Tanie | 249/141 |
| 3,891,363 | 6/1975 | Sievers et al. | 425/28 R |
| 4,447,197 | 5/1984 | Bartley et al. | 425/28 R |

FOREIGN PATENT DOCUMENTS 218991 7/1957 Australia .
2808474 6/1979 Fed. Rep. of Germany .
455897 11/1965 Japan .

Primary Examiner—Willard Hoag
Attorney, Agent, or Firm—Ernst H. Ruf

[57] ABSTRACT

A tire mold having air and gas venting holes is provided with synthetic resin plugs mounted in enlarged bore portions of the vent holes adjacent the inner forming surface of the mold. The plugs are axially compressible and project a slight distance beyond the inner surface of the mold. The molding pressure of the material within the mold compresses the plug whereby an outer surface of the plug becomes generally flush with the inner surface of the mold cavity to substantially eliminate the formation of runners on the molded tire. The plugs preferably are formed of a PTFE (polytetrafluoroethylene) filter leaf membrane material.

14 Claims, 1 Drawing Sheet

FLASH-FREE VENTED TIRE MOLD

TECHNICAL FIELD

The invention relates to tire molds and in particular to tire molds with special inserts or plugs for air and gas vent openings passing through the molds. More particularly, the invention relates to such a plug which when mounted in a vent opening of the mold reduces or eliminates the formation of runners on a tire being molded therein.

BACKGROUND ART

Molds for forming articles and in particular, molds in which rubber tires are valcanized, are usually provided with a plurality of strategically located small diameter passages or vent holes extending from the mold cavity interior to the exterior. These vent holes bleed or discharge trapped air and gas from within the mold during vulcanization of the tire to prevent the formation of air or gas bubbles in confined areas of the mold preventing the flow of rubber into these areas, in order to completely form the final molded product and in particular the side wall, shoulder and tread areas of a rubber tire. The vent holes are normally machined or drilled through the walls of the mold and are provided with some type of filter which permits the passage of the air or gas therethrough without allowing appreciable amounts of rubber to flow through or into the mold vents. Although it is desirable to completely reduce the flow of rubber into the vents to avoid forming flash, such flow does occur resulting in a number of "runners" or rubber flashings being formed on the final molded product or tire. These runners require a finishing operation for the removal of the excess rubber or runners from the tire surface. The runners, depending upon their size and thickness, must be removed from the finished tire. In other molds, the runners will be torn from the tire surface upon removal of the tire from the mold causing an inperfection in the tire surface and plugging or closing the vent openings for subsequent molding operations.

To reduce the formation of runners on molded articles, including tires, various types of plugs have been devised which are inserted into the vent openings which permit the passage of the gases and air therethrough without passage of appreciable rubber. Some examples of these prior art mold vents and in particular vents having types of vent opening plugs are shown in the following patents.

U.S. Pat. No. 3,891,363 discloses the use of Teflon inserts which are inserted into the venting holes to provide anti-adhesive properties to prevent rubber from sticking to the inserts and to permit air to freely discharge from the mold while preventing rubber from fully clogging the vent system.

U.S. Pat. No. 3,822,857 discloses the use of a synthetic resin vent hole plug in the molds for the molding of rubber products. The resin plugs have no adherence to rubber and the air is vented out through a plurality of round microventing holes formed in the plug. The plugs are formed of a nonadhering synthetic resin such as tetrafluorothylene resin.

U.S. Pat. No. 3,804,566 discloses a tire mold having a vent filter of a sintered body containing a plurality of linear air venting holes. The small diameter of the holes in the filter material will result in extremely small rubber projections or runners.

U.S. Pat. No. 4,447,197 discloses a tire mold having a plurality of air vent plugs formed of a plastic material with a low coefficient of friction, such as polysulfone. The plugs are selected of materials which are adapted to prevent creep and swell during use of the mold.

Japanese Patent No. 45-5897 discloses a tire vulcanizing mold with vent plugs comprises of an outer cylindrical portion made of stainless steel having a central plug or rod of a polytetrafluoroethylene.

Australian Patent No. 218,991 discloses a tire mold having a porous sintered stainless steel ring positioned within the vent hole which is covered with a coating of polytetrafluoroethylene (Teflon).

German publication DOS No. 2808474 discloses air permeable elements for molds in which the element is formed of PTFE which completely fill portions of vent nozzles which extend through the mold wall.

Although some prior art mold vents and in particular the vent plugs therefor, do reduce the formation of runners, many of these known prior art plugs are susceptible to clogging and have a relatively short life span requiring continual replacement. Furthermore, such vent plugs cannot withstand mold blasting and require replacement after each mold cleaning operation. Also, some of these prior art mold vent plugs require cement or other means for mounting the plugs in the vent holes increasing the cost of their installation in the mold. This is important for each mold and such increased cost can be considerable over the life of the mold.

Furthermore, all of these prior art vent plugs are generally flush with the inner article forming surface of the mold in an attempt to reduce the formation of runners and thus are "passive" plugs in contrast to the "active" plug of my invention described more fully below. Therefore, the need has existed for an improved mold vent plug which eliminates difficulties encountered with prior vent plugs and achieves desirable results, and in particular, the elimination or reduction of runners of molded rubber on a final molded tire or other product.

DISCLOSURE OF THE INVENTION

Objectives of the invention include providing an improved runnerless tire mold vent which contains a vent plug of a self-releasing polymer which does not allow rubber to stick to the escaping air channel formed within the plug thereby not becoming clogged; and in which the plug is of an active self-purging construction which does not require redrilling of the mold and replacement of the plug during mold cleaning preparations since glass or polymer mold cleaning operations revitalize the outer surface of the plug as the mold is being cleaned.

Still another objective of the invention is to provide such an improved tire mold vent which materially reduces the amount of rubber losses occurring from normally trimmed or useless untrimmed runners, which reduces or eliminates additional manufacturing procedures or operations required to be performed on a tire to remove the runners after vulcanizing; in which the improved vent provides a vulcanized tire free of snags and cuts which occur during trimming operations; and in which the vents produce no readily visible surface changes or pin vents on the surface of the molded tire.

A still further objective of the invention is to provide such an improved tire mold vent in which the tire mold is formed with a plurality of vent openings having vent plugs formed of a PTFE membrane material whereby the exposed ends of the filter plugs project a slight distance beyond the inner surface of the mold into the mold cavity so that the plugs are compressed sufficiently by the vulcanizing pressure of the trapped material during normal molding operations whereby the surfaces of the plugs are generally flush with the inner surface of the mold thereby reducing or completely eliminating any runners being formed on the molded tire.

A further objective of the invention is to provide such a tire mold vent in which the filter plugs can be installed and replaced easily by a force fit engagement in drilled openings formed in the ends of the mold vent holes without requiring an adhesive or other securing means; and in which the filtering medium of the vent plugs can be of a variety of viscoelastic polymers capable of withstanding the temperatures and pressure of tire vulcanization and having a porosity ranging from 70% to 90% solid to void volume.

Still another objective of the invention is to provide such an improved tire mold vent and in particular a vent plug therefor which solves problems existing in the art, and which provides a molded tire virtually free of runners in a simple, effective and economical manner.

These objectives and advantages are obtained by the improved runnerless tire mold vent of the invention, the general nature of which may be stated as including a mold having a mold cavity with an inner article forming surface and an outer surface, at least one vent hole extending from said forming surface to said outer surface, and a filter plug mounted in said vent hole for venting air or gases from the mold cavity, said filter plug being formed of a slightly compressible synthetic resin and extending along a portion of the vent hole outwardly a slight distance beyond the inner forming surface and into the mold cavity whereby the plug is compressed slightly during a molding operation and an outer end surface of the plug is generally flush with said inner forming surface eliminating the formation of runners on an article being molded within the cavity.

BRIEF DESCRIPTION OF THE DRAWINGS

A preferred embodiment of the invention, illustrative of the best mode in which applicant has contemplated applying the principles of the invention is set forth in the following description and is shown in the drawings, and is particularly and distinctly pointed out and set forth in the appended claims.

Similar numerals refer to similar parts throughout the drawings.

BEST MODE FOR CARRYING OUT THE INVENTION

Figure 1:
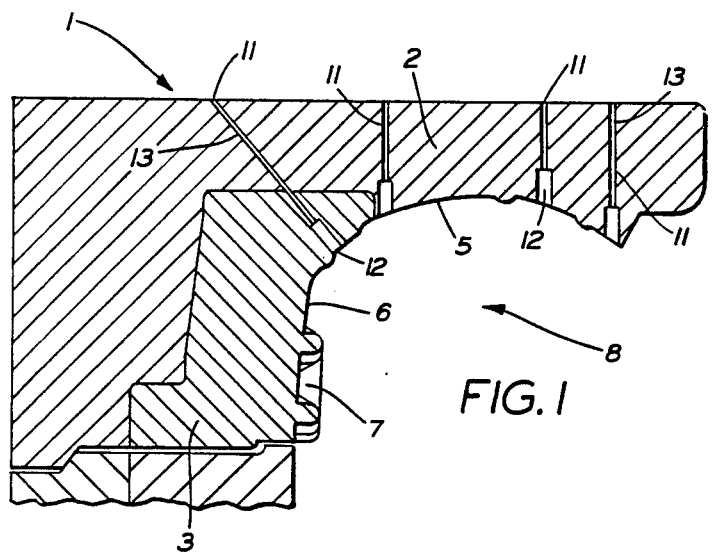
FIG. 1 is a fragmentary sectional view of a portion of a tire mold having a plurality of air vents formed therein.

FIG. 1 shows a portion of a tire mold, indicated generally at 1, which includes a mold shell or housing 2 in which is mounted a replaceable portion of a tread segment or ring 3. The mold shell has an internal cavity forming surface 5 as well as a similar surface 6 being provided by tread segment 3. A plurality of tread forming projections 7 may also be provided on tread segment 3. Thus, surfaces 5 and 6 form portions of a main mold cavity indicated generally at 8.

A tire (not shown) or other molded article is cured and formed in mold cavity 8 by being pressurized against surface portions 5 and 6 and the other surfaces (not shown) which enclose cavity 8. Pressure, in addition to heat, is required in the vulcanizing operation.

Gases which are produced during the vulcanizing operation, and air that is trapped between the rubber material and the mold cavity surfaces, are discharged from within cavity 8 through a plurality of strategically located vent holes 11 formed in shell 2 and tread segment 3. A usual tire mold may contain hundreds of vent holes 11, only several of which are shown in FIG. 1 for illustration purposes.

Figure 3:
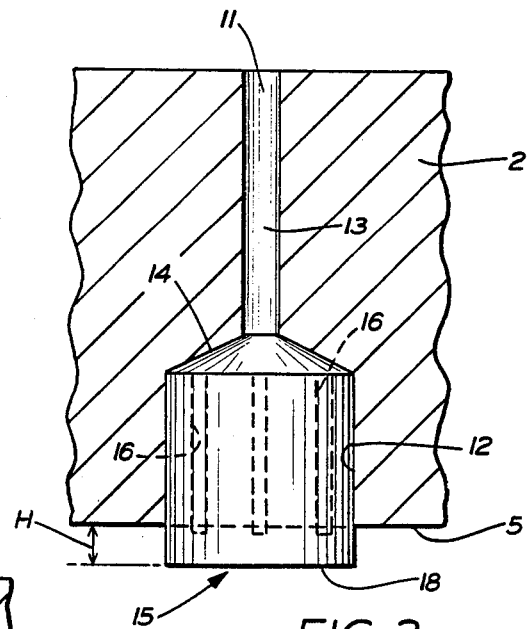
FIG. 3 is an enlarged sectional view of one of the improved mold vents with a vent plug being shown mounted therein.

FIG. 3 shows a greatly enlarged view of one of the vent holes 11 which is formed in mold shell 2. Vent hole 11 consists of a first enlarged cylindrical bore 12 and a reduced diameter cylindrical bore 13 connected to enlarged bore 12 by a conical bore section 14. Bores 12 and 13 normally are formed by drilling with the tip of the drilling tool forming conical bore section 14. Section 14 forms no significant portion of the overall vent hole construction and is merely the result of a usual drilling operation. If desired, reduced diameter bore 13 could communicate directly with inner bore 12 without intervening conical bore 14 being required. Preferably the diameter of smaller bore 13 will be less than one half of the diameter of larger bore 12.

Figure 2:
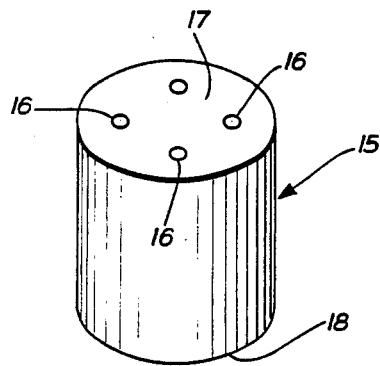
FIG. 2 is an enlarged perspective view of one type of vent plug to be mounted in the air vents as shown in FIG. 1.

FIG. 2 shows a mold vent plug or filter, indicated generally at 15, which is mounted, preferably by a press fit, into inner cylindrical bore 12 as shown in FIG. 3. Vent plug 15 preferably has a cylindrical configuration, generally complementary to and slightly larger than the diameter of bore 12. Plug 15 may be formed with a plurality of enlarged blind air passages 16 extending axially inwardly from an inner circular face 17 thereof but terminating before reaching outer face 18. Air passages 16 assist in permitting the passage of air and gases through the plug and out of the mold cavity during vulcanizing of a rubber tire. However, the same are not mandatory for successful operation of the improved tire mold vent of the invention.

Mold vent plug 15 is formed of a resin material which is slightly compressible axially when exposed to the pressure and heat of vulcanization in order to achieve the main feature of the invention, that is, the reduction or elimination of runners on the final molded tire product. Plug 15 preferably is formed of PTFE (tetrafluoroethylene) which is a synthetic resin of a low friction plastic membrane material. One type of filter material found most satisfactory is manufactured and distributed by Porex Technologies of Fairburn, Ga., under its trademark Porex PTFE FILTERLEAF Membrane. Representative plastic families having materials exhibiting suitable properties may be used and need not be limited to the exact type of membrane described above and in further detail below. This material has a specific gravity between 0.2 and 0.8.

The filtering material must withstand temperatures approaching 500° F. since the tire molds generally operate at a temperature range between 275° F. to 400° F., and must be able to withstand tire molding pressures within the range of 300 psi to 450 psi.

Figure 4:
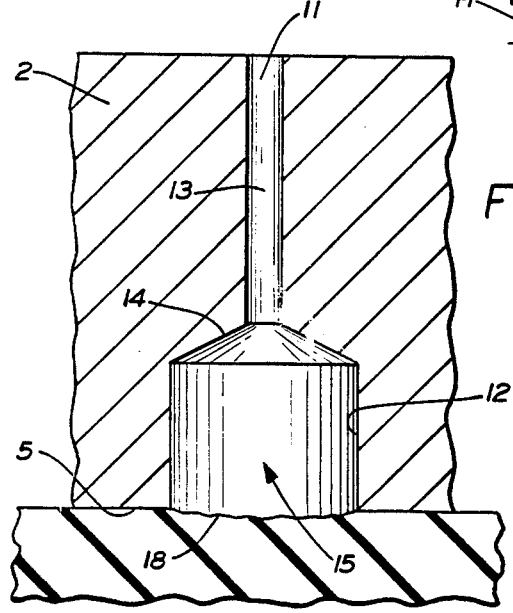
FIG. 4 is a fragmentary sectional view, similar to FIG. 3, showing the compressed position of the vent plug upon contact by the rubber material being vulcanized within the mold cavity.
Figure 5:
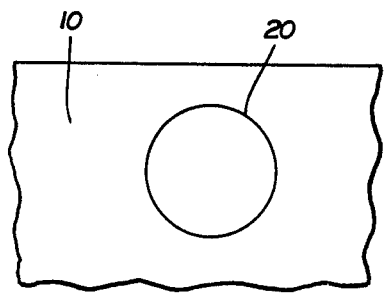
FIG. 5 is an enlarged plan view of a surface of a tire showing the only indication of a vent plug after a molding operation.

In accordance with the main feature of the invention, air vent plug 15 is formed of such a membrane material which has sufficient axial compressibility whereby the plug, when inserted in cylindrical bore 12, extends a slight distance outwardly beyond inner mold forming surface 5, indicated by arrow H in FIG. 3. This compressibility enables the plug, upon experiencing the molding pressure, to compress slightly axially whereby exposed face 18 is generally flush with mold surface 5 as shown in FIG. 4 thus preventing the inward extension or formation of any runners. The only visible indication of a vent hole on the final molded tire is a small circle represented at 20 in FIG. 5, which requires no subsequent grinding operation for removal of any protruding rubber and which is unobtrusive to viewing on the finished tire.

It is important that the vent plug be axially compressed a proper distance so that the plug surface or face 18 is generally flush with cavity surface 5 to eliminate the formation of runners. A vent plug having physical characteristics and specifications such as described above, is installed so that it extends a distance H outwardly beyond surface 5 according to the following formula:

$$H = 0.0666 \times (70/P) \times D$$

P = membrane filter porosity (solid to void ratio)
D = diameter of filter medium (plug 15)

Figure 6:
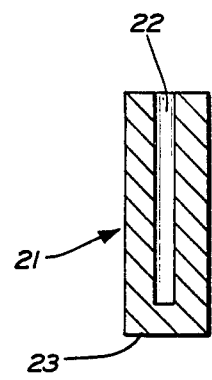
FIG. 6 is an enlarged sectional view showing a modified form of a vent plug which may be used in the improved mold vent of the invention.

A slightly modified form of the improved vent plug is indicated generally at 21, and is shown in FIG. 6. Plug 21 has a cylindrical configuration similar to that of vent plug 15 of FIG. 2, but is of a considerably smaller diameter and is formed with only a single centrally located blind air passage 22 which extends only partially through the center of the plug but terminates before reaching the outer surface 23.

In a typical installation such as shown in FIGS. 2–4, cylindrical bore 12 will have an axial length of approximately 0.25 inches and a diameter of 0.310 inches with vent bore 13 having a diameter of 0.10 inches. Vent plug 15 will be approximately ¼ inch long and have a diameter of approximately 0.33 inches. Vent holes normally will be drilled so that enlarged cylindrical bore portion 12 has a diameter between 0.08 inches to 0.40 inches and has a depth of 0.6 to 8 times the corresponding diameter of the associate vent bore 12.

Vent plug 21 as shown in FIG. 6, will have a diameter of between 0.130 inches and 0.255 inches with a length of approximately 0.275 inches. Air passage 22 will have a diameter ranging between 1/32 of an inch for a plug diameter of 0.130 inches up to 1/16 inch diameter for a plug diameter of 0.255 inches.

Furthermore the particular synthetic resin material for forming vent plug 15 will have a porosity ranging from 70% to 90% solid to void volume. Also, it has been determined that the outer dimensions of plugs 15 and 21 or other plug configurations, preferably are provided with slightly enlarged dimensions with respect to those of the bores into which they are to be inserted. Generally, a compressible plug having a diameter of approximately two to six percent greater than the bore diameter provides a sufficient press fit engagement when inserted into the bore. If desired, the outer contour and dimensions of the plug could more closely match the interior contour and dimensions of the plug receiving bore with the plug being retained therein by an adhesive. However, the use of adhesive requires an additional cost in both materials and installation, and it is believed that the best results are achieved by a press fit engagement of the plug within its vent bore.

The various dimensions set forth above are for illustrative purposes only and may be varied without effecting the concept of the invention. The principle feature of the invention is the mounting of a "active" plug in the vent hole adjacent the mold forming surface. The term "active" as used herein means a plug which is slightly axially compressible when subjected to the vulcanizing pressure, so that an outer end thereof which extends axially beyond the mold forming surface is compressed by the vulcanizing pressure whereby the outer face is generally flush with the inner mold surface eliminating the formation of runners on the molded tire product.

If desired a tubular press fit spacer may be inserted a predetermined axial distance into an existing or new vent hole which has a single diameter vent hole configuration shown in FIGS. 3 and 4. This spacer serves as a stop for the subsequently inserted active plug as does the bottom of the outer enlarged bore portion 12.

Accordingly, the improved runnerless tire mold vent is simplified, provides an effective, safe, inexpensive, and efficient construction which achieves all the enumerated objectives, provides for eliminating difficulties encountered with prior vent constructions, and solves problems and obtains new results in the art.

In the foregoing description, certain terms have been used for brevity, clearness and understandingn; but no unnecessary limitations are to be implied therefrom beyond the requirements of the prior art, because such terms are used for descriptive purposes only and are intended to be broadly construed.

Moreover, the description and illustration of the invention is by way of example and the scope of the invention is not limited to the exact details shown or described.

Having now described the features, discoveries and principles of the invention, the manner in which the improved runnerless tire mold vent is constructed and used, the characteristics of the construction, and the advantageous, new and useful results obtained; the new and useful structures, devices, elements, arrangements, parts, and combinations, are set forth in the appended claims.

What is claimed is:

1. A mold having a mold cavity with an inner article forming surface and an outer surface, at least one vent hole extending from said forming surface to said outer surface, and a filter plug mounted in said vent hole for venting air or gases from the mold cavity, said filter plug being formed of a slightly compressible porous synthetic resin and extending along a portion of the vent hole a slight distance beyond the inner forming surface and into the mold cavity so that the plug is compressed slightly during a molding operation and an end surface of the plug is generally flush with said inner forming surface reducing the formation of flash on an article being molded within the cavity.

2. The mold defined in claim 1 in which the vent hole includes a first cylindrical bore extending inwardly from the mold inner surface and at least a second cylindrical bore of a smaller diameter extending from said first bore to the outer surface of the mold.

3. The mold defined in claim 2 in which the diameter of the second bore is less than half the diameter of the first bore.

4. The mold defined in claim 2 in which the first bore joins with the second bore by a conical bore section.

5. The mold defined in claim 2 in which the filter plug is generally cylindrical and extends beyond the inner forming surface and into the mold cavity a distance H where H is defined by the formula $H = 0.0666 \times (70/P) \times D$ where P is the porosity of the plug (solid to void ratio), and where D equals the diameter of the plug.

6. The mold defined in claim 5 in which the filter plug is a viscoelastic polymer with a porosity ranging from 70 to 90 percent solid to void volume.

7. The mold defined in claim 5 in which the filter plug is polytetrafluoroethylene.

8. The mold defined in claim 5 in which the filter plug is approximately ¼ inches long and has a diameter of approximately 0.33 inches.

9. The mold defined in claim 2 in which the filter plug is secured in the first bore by a press fit.

10. The mold defined in claim 1 in which the vent plug is an elongated cylinder; and in which a central axially extending hole is formed throughout a portion of said cylinder.

11. The mold defined in claim 10 in which the cylinder has a diameter in the range of 0.0816 inches to 0.424 inches and a length of approximately 0.6 to 8 times the cylinder diameter.

12. The mold defined in claim 2 in which the first bore has a diameter in the range of 0.08 inches to 0.400 inches and an axial length in the range of 0.6 to 8 times said first bore diameter.

13. The mold defined in claim 7 in which the plug has a specific gravity in the range of from 0.2 to 0.8.

14. A mold having a mold cavity with an inner article forming surface and an outer surface, at least one vent hole extending from said forming surface to said outer surface, and a filter plug mounted in said vent hole for venting air or gases from the mold cavity, said filter plug being formed of a compressible porous synthetic resin and extending a predetermined distance beyond the inner forming surface and into the mold cavity so that the plug is compressed by material in the mold cavity during molding and an end surface of the plug generally conforms to the inner forming surface to substantially eliminate the flow of material into the vent hole and resulting flash.

* * * * *